United States Patent
Brandwine et al.

(10) Patent No.: US 11,228,449 B2
(45) Date of Patent: *Jan. 18, 2022

(54) SECURE INTERFACE FOR INVOKING PRIVILEGED OPERATIONS

(71) Applicant: Amazon Technologies, Inc., Reno, NV (US)

(72) Inventors: Eric Jason Brandwine, Haymarket, VA (US); Matthew Shawn Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

This patent is subject to a terminal disclaimer.

(21) Appl. No.: 16/113,471

(22) Filed: Aug. 27, 2018

(65) Prior Publication Data

US 2019/0068379 A1 Feb. 28, 2019

Related U.S. Application Data

(63) Continuation of application No. 13/746,737, filed on Jan. 22, 2013, now Pat. No. 10,063,380.

(51) Int. Cl.
*G06F 21/00* (2013.01)
*H04L 9/32* (2006.01)
(Continued)

(52) U.S. Cl.
CPC ........ *H04L 9/3263* (2013.01); *G06F 9/45558* (2013.01); *G06F 21/335* (2013.01);
(Continued)

(58) Field of Classification Search
CPC . H04L 9/3263; H04L 9/3247; H04L 63/0823; G06F 21/335; G06F 21/51;
(Continued)

(56) References Cited

U.S. PATENT DOCUMENTS

| | | |
|---|---|---|
| 5,410,602 A | 4/1995 | Finkelstein |
| 5,638,541 A | 6/1997 | Sadashivaiah |

(Continued)

FOREIGN PATENT DOCUMENTS

| | | |
|---|---|---|
| AU | 2014209470 | 7/2017 |
| CA | 2898906 | 10/2017 |

(Continued)

OTHER PUBLICATIONS

Jakub Szefer et al., Architectural Support for Hypervisor-Secure Virtualization, Mar. 2012, ACM, pp. 437-450. (Year: 2012).*

(Continued)

*Primary Examiner* — Luu T Pham
*Assistant Examiner* — Fahimeh Mohammadi
(74) *Attorney, Agent, or Firm* — Hogan Lovells US LLP

(57) ABSTRACT

A formalized set of interfaces (e.g., application programming interfaces (APIs)) is described, that uses a security scheme, such as asymmetric (or symmetric) cryptography, in order authorize and authenticate requests sent to a virtualization later. The interfaces can be invoked to perform security monitoring, forensic capture, and/or patch software systems at runtime. In addition to the foregoing, other aspects are described in the claims, detailed description, and figures.

17 Claims, 7 Drawing Sheets

(51) Int. Cl.
*G06F 21/33* (2013.01)
*G06F 21/51* (2013.01)
*G06F 21/53* (2013.01)
*G06F 21/62* (2013.01)
*G06F 9/455* (2018.01)
*H04L 29/06* (2006.01)
*G06F 21/60* (2013.01)

(52) U.S. Cl.
CPC .............. *G06F 21/51* (2013.01); *G06F 21/53* (2013.01); *G06F 21/602* (2013.01); *G06F 21/629* (2013.01); *H04L 63/0823* (2013.01); *G06F 2009/45587* (2013.01); *G06F 2221/033* (2013.01); *G06F 2221/2107* (2013.01); *G06F 2221/2115* (2013.01); *G06F 2221/2141* (2013.01); *G06F 2221/2149* (2013.01)

(58) Field of Classification Search
CPC ...... G06F 21/53; G06F 21/602; G06F 21/629; G06F 9/45558; G06F 2009/45587; G06F 2221/033; G06F 2221/2107; G06F 2221/2115; G06F 2221/2141; G06F 2221/2149

See application file for complete search history.

(56) References Cited

U.S. PATENT DOCUMENTS

| | | | |
|---|---|---|---|
| 5,805,910 A | 9/1998 | Lee | |
| 6,704,871 B1 | 3/2004 | Kaplan et al. | |
| 6,826,690 B1 | 11/2004 | Hind | |
| 6,826,715 B1 | 11/2004 | Meyer | |
| 7,020,880 B2 | 3/2006 | Mellen-Garnett | |
| 7,123,721 B2 | 10/2006 | Panjwani et al. | |
| 7,272,832 B2 | 9/2007 | Gardner | |
| 7,418,596 B1* | 8/2008 | Carroll | H04W 12/03 713/169 |
| 8,208,637 B2 | 6/2012 | Ellison | |
| 8,336,079 B2 | 12/2012 | Budko et al. | |
| 8,364,638 B2 | 1/2013 | Nickolov et al. | |
| 8,392,709 B1* | 3/2013 | Agrawal | H04L 9/3228 713/169 |
| 8,417,885 B2 | 4/2013 | Chou et al. | |
| 8,429,630 B2 | 4/2013 | Nickolov et al. | |
| 8,473,557 B2 | 6/2013 | Ramakrishnan et al. | |
| 8,478,725 B2 | 7/2013 | Mashtizadeh et al. | |
| 8,494,170 B2 | 7/2013 | Kahler | |
| 8,539,587 B2 | 9/2013 | Proudler et al. | |
| 8,732,462 B2 | 5/2014 | Bhathena et al. | |
| 8,738,932 B2 | 5/2014 | Lee et al. | |
| 8,800,050 B2 | 8/2014 | Ray | |
| 8,880,667 B2 | 11/2014 | Novak et al. | |
| 8,909,939 B1* | 12/2014 | Beda, III | G06F 21/53 713/189 |
| 9,565,207 B1* | 2/2017 | Marr | H04L 63/145 |
| 10,063,380 B2 | 8/2018 | Brandwine et al. | |
| 2002/0018569 A1 | 2/2002 | Panjwani et al. | |
| 2002/0196946 A1 | 11/2002 | Challener et al. | |
| 2003/0074570 A1 | 4/2003 | Miyoshi | |
| 2003/0101322 A1* | 5/2003 | Gardner | G06F 12/1491 711/163 |
| 2004/0064691 A1 | 4/2004 | Lu | |
| 2004/0161110 A1 | 8/2004 | Kanai | |
| 2005/0044363 A1* | 2/2005 | Zimmer | H04L 63/0823 713/170 |
| 2006/0133604 A1 | 6/2006 | Buer | |
| 2006/0256106 A1 | 11/2006 | Scarlata | |
| 2007/0074034 A1 | 3/2007 | Adams | |
| 2008/0134321 A1* | 6/2008 | Rajagopal | G06F 21/6281 726/21 |
| 2008/0282348 A1 | 11/2008 | Proudler | |
| 2008/0320308 A1* | 12/2008 | Kostiainen | H04L 9/3234 713/171 |
| 2009/0106551 A1 | 4/2009 | Boren | |
| 2009/0119763 A1 | 5/2009 | Park | |
| 2009/0154709 A1 | 6/2009 | Ellison | |
| 2009/0169012 A1 | 7/2009 | Smith | |
| 2009/0172038 A1 | 7/2009 | Mintchev | |
| 2009/0178123 A1 | 7/2009 | Carpenter | |
| 2009/0276771 A1 | 11/2009 | Nickolov et al. | |
| 2009/0293057 A1 | 11/2009 | Larkin | |
| 2010/0023755 A1 | 1/2010 | Kotani | |
| 2010/0281273 A1 | 1/2010 | Lee | |
| 2010/0030982 A1 | 2/2010 | Sela | |
| 2010/0071025 A1 | 3/2010 | Devine | |
| 2010/0082960 A1 | 4/2010 | Grobman | |
| 2010/0082991 A1 | 4/2010 | Baldwin | |
| 2010/0169948 A1 | 7/2010 | Budko | |
| 2010/0178977 A1 | 7/2010 | Kim | |
| 2010/0223611 A1 | 9/2010 | Mahalingam | |
| 2010/0257602 A1 | 10/2010 | Kettler et al. | |
| 2010/0332635 A1 | 12/2010 | Rogel | |
| 2010/0332820 A1 | 12/2010 | Matsushima | |
| 2011/0066597 A1 | 3/2011 | Mashtizadeh | |
| 2011/0088032 A1* | 4/2011 | Garrett | G06F 9/45533 718/1 |
| 2011/0202917 A1 | 8/2011 | Laor | |
| 2011/0208908 A1 | 8/2011 | Chou et al. | |
| 2012/0054367 A1 | 3/2012 | Ramakrishnan et al. | |
| 2012/0102335 A1 | 4/2012 | Goodman | |
| 2012/0117625 A1 | 5/2012 | Ray | |
| 2012/0124675 A1 | 5/2012 | Lee | |
| 2012/0204020 A1 | 8/2012 | Novak et al. | |
| 2012/0324446 A1 | 12/2012 | Fries | |
| 2013/0007439 A1* | 1/2013 | Yamashita | G06F 9/441 713/2 |
| 2013/0013921 A1* | 1/2013 | Bhathena | H04L 63/0471 713/168 |
| 2013/0042101 A1* | 2/2013 | Neumann | H04L 9/3247 713/156 |
| 2013/0073856 A1 | 3/2013 | Sherkin | |
| 2013/0086383 A1* | 4/2013 | Galvao de Andrade | G06F 21/57 713/171 |
| 2013/0097356 A1 | 4/2013 | Dang | |
| 2013/0151848 A1 | 6/2013 | Baumann | |
| 2013/0151857 A1* | 6/2013 | Agrawal | H04L 9/3247 713/178 |
| 2013/0198512 A1 | 8/2013 | Rubin | |
| 2013/0290711 A1 | 10/2013 | Rajkumar | |
| 2014/0032913 A1* | 1/2014 | Tenenboym | H04L 9/3247 713/176 |
| 2014/0040997 A1* | 2/2014 | Anantharaju | G06F 21/53 726/5 |
| 2014/0089658 A1* | 3/2014 | Raghuram | G06F 9/45533 713/155 |
| 2014/0208097 A1 | 7/2014 | Brandwine et al. | |
| 2014/0208111 A1 | 7/2014 | Brandwine et al. | |
| 2015/0169899 A1* | 6/2015 | Kopasz | H04L 9/3006 713/165 |

FOREIGN PATENT DOCUMENTS

| | | |
|---|---|---|
| CN | 104969201 | 10/2015 |
| CN | 201480007923.8 | 11/2015 |
| CN | 201480010597.6 | 11/2015 |
| EP | 2948854 | 2/2015 |
| EP | 2948855 | 2/2015 |
| EP | 2948864 | 2/2015 |
| IN | 6468/DELNP/2015 | 6/2016 |
| IN | 6469/DELNP/2015 | 7/2016 |
| IN | 6474/DELNP/2015 | 10/2016 |
| JP | 2003-6306 | 1/2003 |
| JP | 2003-051838 | 2/2003 |
| JP | 2005-529392 | 9/2005 |
| JP | 2005-122561 | 2/2006 |
| JP | 2007-122303 | 5/2007 |
| JP | 2007-214767 | 8/2007 |
| JP | 2008-535049 | 8/2008 |
| JP | 2010-517162 | 5/2010 |
| JP | 2011-211255 | 10/2011 |

(56) References Cited

FOREIGN PATENT DOCUMENTS

| | | |
|---|---|---|
| JP | 2012-194710 | 11/2012 |
| JP | 2013-58006 | 3/2013 |
| JP | 2016-509725 | 3/2016 |
| JP | 2016-509726 | 3/2016 |
| JP | 2016-509806 | 3/2016 |
| JP | 6092428 | 3/2017 |
| KR | 2011-0035573 | 4/2011 |
| KR | 10-1701664 | 1/2017 |
| KR | 10-1704329 | 2/2017 |
| KR | 101735982 | 5/2017 |
| SG | 11201505651 | 6/2016 |
| SG | 11201505652 U | 6/2016 |
| WO | 2009/107351 | 3/2009 |
| WO | 2009/155574 | 12/2009 |
| WO | 2014116743 | 7/2014 |

OTHER PUBLICATIONS

Jingyu Hua et al., Barrier: A Lightweight Hypervisor For Protecting Kernel Integrity via Memory Isolation, Mar. 2012, ACM, pp. 1470-1477. (Year: 2012).*
Ronald Perez et al., Virtualization and Hardware-Based Security, Sep.-Oct. 2008, IEEE, vol. 6, Issue: 5, pp. 24-31. (Year: 2008).*
Saketh Bharadwaja et al., Collabra: A Xen Hypervisor based Collaborative Intrusion Detection System, Jul. 12, 2011, IEEE, pp. 695-700. (Year: 2011).*
Examination Report issued in IN Application No. 6469/DELNP/2015 dated Jan. 31, 2020.
Notice of Acceptance of corresponding Australian Application No. 2014209470 dated Mar. 24, 2017.
Notice of Allowance issued in corresponding Canadian Application No. 2898906 dated Jun. 28, 2017.
First Office Action issued in corresponding Chinese Application No. 2014800056039 dated Apr. 12, 2017.
Second Office Action issued in corresponding Chinese Application No. 2014800056039 dated Jan. 15, 2018.
Third Office Action issued in corresponding Chinese Application No. 2014800056039 dated Sep. 30, 2018.
Second Office Action issued in corresponding Chinese Application No. 2014800105976 dated Nov. 16, 2017.
Third Office Action issued in corresponding Chinese Application No. 2014800105976 dated Jul. 17, 2019.
Decision to Grant issued in EP Application No. 14743308 dated Apr. 11, 2019.
Notification of Grant issued in CN Application 2014800056039 dated Apr. 10, 2019.
Decision to Grant issued in EP Application No. 14743678.6 dated Jan. 31, 2019.
U.S. Non-Final Office Action issued in U.S. Appl. No. 13/746,737 dated May 21, 2015.
U.S. Final Office Action issued in U.S. Appl. No. 13/746,737 dated Jan. 20, 2016.
U.S. Non-Final Office Action issued in U.S. Appl. No. 13/746,737 dated Jun. 16, 2016.
U.S. Final Office Action issued in U.S. Appl. No. 13/746,737 dated Dec. 1, 2016.
U.S. Non-Final Office Action issued in U.S. Appl. No. 13/746,737 dated Aug. 10, 2017.
U.S. Final Office Action issued in U.S. Appl. No. 13/746,737 dated Dec. 14, 2017.
U.S. Notice of Allowance issued in U.S. Appl. No. 13/746,737 dated May 14, 2018.
Jakub Szefer et al., Architectural Support for Hypervisor-Secure Virtualization, Mar. 2012, ACM, pp. 437-450.
Stephen Soltesz et al., Container-based Operating System Virtualization: A Scalable, High-performance Alternative to Hypervisors, Mar. 21-23, 2007, ACM, pp. 275-287.
Ronald Perez et al., Virtualization and Hardware-Based Security, Sep.-Oct. 2008, IEEE, vol. 6, Issue: 5, pp. 24-31.
Jianhua Sun et al., A Virtualized Harvard Architectural Approach to Protect Kernel Code, May 26, 2009, IEEE, pp. 1020-1024.
U.S. Final Office Action issued in U.S. Appl. No. 13/746,702 dated Sep. 30, 2016.
U.S. Notice of Allowance issued in U.S. Appl. No. 13/746,702 dated Jan. 20, 2017.
JP Office Action issued in application serial No. 2015-555248 dated Jan. 17, 2017.
JP Office Action issued in application serial No. 2015-555247 dated Jan. 24, 2017.
AU Office Action issued in application serial No. 2014209470 dated Sep. 2, 2016.
AU Office Action issued in application serial No. 2014209471 dated Oct. 26, 2016.
IN Notice of Publication issued in application serial No. 6468/DELP/2016 dated Oct. 6, 2016.
IN Notice of Publication issued in application serial No. 6474/DELP/2015 dated Oct. 6, 2016.
KR Office Action issued in application serial No. 10-2015-7022330 dated Dec. 6, 2016.
CA Office Action issued in application serial No. 2,898,907 dated Sep. 14, 2016.
CA Office Action dated Aug. 8, 2016 issued in application serial No. 2,898,903.
EP Search Report dated Aug. 29, 2016 issued in application serial No. 14743515.0.
JP Office Action dated Sep. 6, 2016 issued in application serial No. 2015-555246.
KR Office Action dated Jun. 27, 2016 issued in application serial No. 10-2015-7022330.
EP Search Report dated Aug. 26, 2016 in application serial No. 14743308.0.
KR Office Action dated Jul. 15, 2016 issued in application serial No. 10-2015-7022744.
Notice of Allowance dated May 26, 2016, received in U.S. Appl. No. 13/746,780.
Tsutomu Nomoto et al., Using a Hypervisor to Migrate Running Operating Systems to Secure Virtual Machines, Jul. 19-23, 2010, IEEE, pp. 37-46.
Chen Wen-Zhi, Cerberus : A Novel Hypervisor to Provide Trusted and Isolated Code Execution, Aug. 7-8, 2010, IEEE, pp. 330-333.
Dong-Guen Kim et al., Design of the Operating System Virtualization on L4 Microkernel, Sep. 2-4, 2008, IEEE, pp. 307-310.
Abhinav Srivastava et al., Efficient Protection of Kernel Data Structures via Object Partitioning, Dec. 2012, ACM, pp. 429-438.
EP Search Report dated Aug. 16, 2016 in application serial No. 14743678.6.
Cuong Le et al. "Protecting xen hypercalls: intrusion detection/prevention in a virtualization environment" Jul. 31, 2009.
Specification Version: "TCG TPM Main Part 3 Commands", Feb. 13, 2005.
Berger S. et al. "IBM Research Report RC23879, vTPM: Virtualizing the Trusted Platform Module", IBM Research Report San Jose, CA US, Feb. 14, 2006 pp. 1-18.
AU Office Action dated Apr. 13, 2016 issued in application serial No. 2014209470.
AU Office Action dated Apr. 5, 2016 issued in application serial No. 2014209472.
AU Office Action dated Apr. 4, 2016 issued in application serial No. 2014209471.
SG Written Opinion dated Oct. 16, 2015 issued in application serial No. 11201505654Y.
U.S. Final Office Action dated Jan. 20, 2016 issued in U.S. Appl. No. 13/746,737.
WO International Preliminary Report on Patentability issued in application serial No. PCT/US2014/012604.
U.S. Non-Final Office Action dated Oct. 23, 2014 for U.S. Appl. No. 13/746,702.
U.S. Final Office Action dated May 13, 2015 for U.S. Appl. No. 13/746,702.
PCT International Search Report and Written Opinion dated Jun. 16, 2014 for International Application No. PCT/US 14/12605.

(56) References Cited

OTHER PUBLICATIONS

PCT International Search Report and Written Opinion dated Jun. 16, 2014 for International Application No. PCT/US 14/12606.
PCT International Search Report and Written Opinion dated Jun. 13, 2014 for International Application No. PCT/US 14/12604.
U.S. Non-Final Office Action dated Apr. 27, 2015 for U.S. Appl. No. 13/746,780.
PCT International Preliminary Report on Patentability dated Jul. 28, 2015 for International Application No. PCT/US 14/12606.
PCT International Preliminary Report on Patentability dated Jul. 28, 2015 for International Application No. PCT/US 14/12604.
PCT International Preliminary Report on Patentability dated Jul. 28, 2015 for International Application No. PCT/US 14/12605.
U.S. Final Office Action dated Oct. 21, 2015 for U.S. Appl. No. 13/746,780.
Intellectual Property Office of Singapore Written Opinion dated Sep. 29, 2015 for Application No. 11201505651W.
Intellectual Property Office of Singapore Written Opinion dated Oct. 10, 2015 for Application No. 11201505652U.
Examination Report issued in IN Application No. 6468/DELNP/2015 dated Dec. 12, 2019.
Examination Report issued in IN Application No. 6474/DELNP/2015 dated Dec. 30, 2019.

\* cited by examiner

SECURE INTERFACE FOR INVOKING PRIVILEGED OPERATIONS

CROSS-REFERENCE TO RELATED APPLICATIONS

This application is a continuation of allowed U.S. application Ser. No. 13/746,737 entitled "SECURE INTERFACE FOR INVOKING PRIVILEGED OPERATIONS," filed Jan. 22, 2013, which is incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

Many cloud computing providers utilize virtualization to allow multiple users to share the underlying hardware and/or software resources. Virtualization can allow computing servers, storage device or other resources to be partitioned into multiple isolated instances (e.g., virtual machines) that are each owned by a particular user. These virtual machines are often hosted using a hypervisor running on a host computing device. In this context, the hypervisor and the guest operating system kernel act as security enforcement mechanisms. For example, the hypervisor typically controls the various virtual machines on the host and the kernel controls the various processes on the virtual machine. For security reasons, both the hypervisor and the kernel are made difficult to modify or alter. Occasionally, however, it may be desirable to modify the code of the hypervisor or the kernel at runtime for reasons, such as to apply software patches, perform security monitoring and the like.

BRIEF DESCRIPTION OF THE DRAWINGS

Various embodiments in accordance with the present disclosure will be described with reference to the drawings, in which.

DETAILED DESCRIPTION

Figure 1:
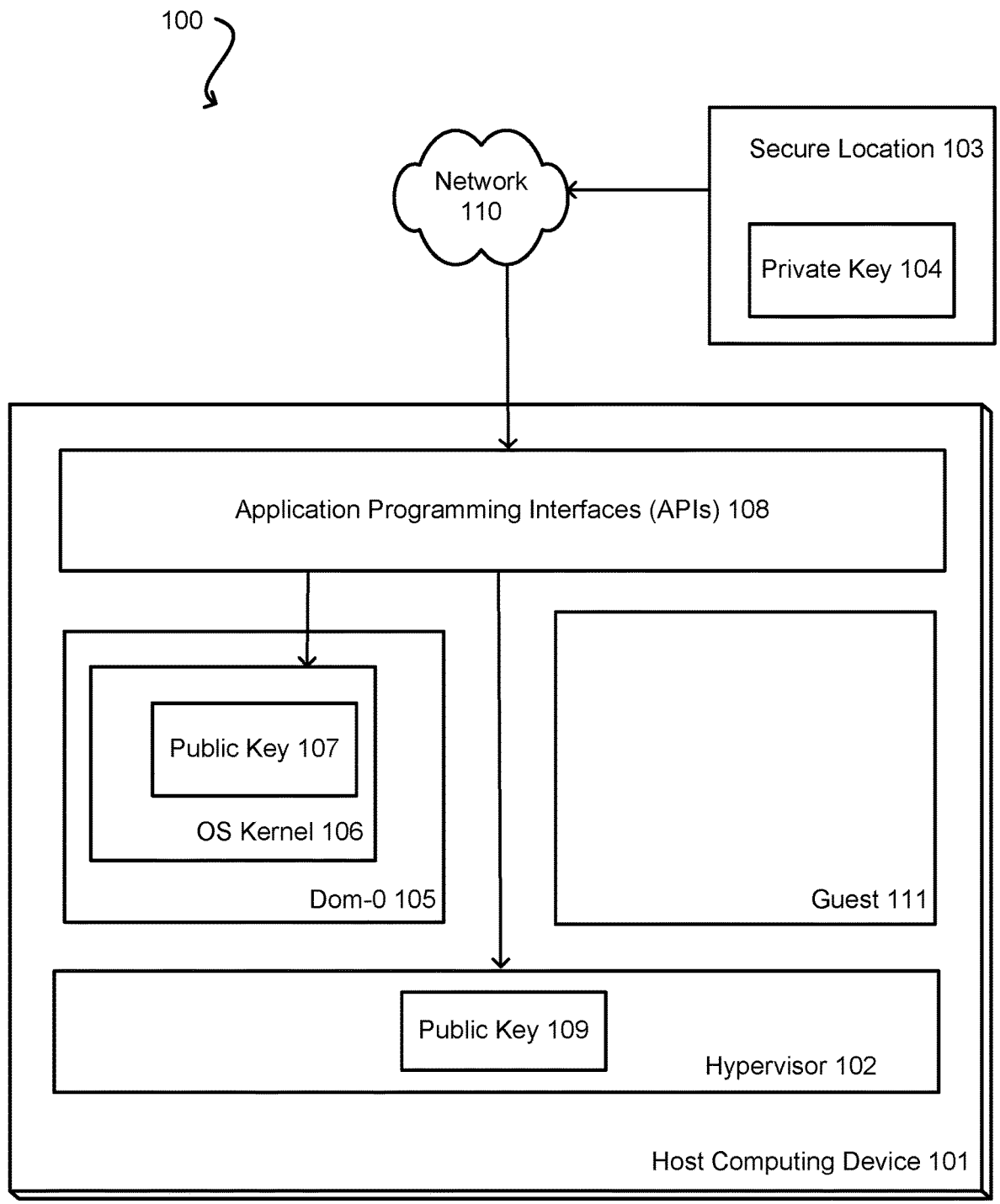
FIG. 1 illustrates an example of using asymmetric cryptography to sign API requests for performing privileged operations, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for performing privileged operations and modifying software code in computing resources, such as operating system kernels and/or hypervisors. In particular, various embodiments provide a formalized set of interfaces (e.g., application programming interfaces (APIs)) that use a security scheme, such as asymmetric (or symmetric) cryptography, in order to enable privileged operations to be performed and code to be securely added to or modified on the operating system (OS) kernel and/or the hypervisor. These interfaces can be invoked to perform security monitoring, forensic capture, and/or patch software systems at runtime.

Conventionally, the kernel and the hypervisor serve as security enforcement mechanisms that dictate which actions the various processes and components are allowed to perform (e.g., which memory portions an application can access). If the kernel or the hypervisor were allowed to be freely modified, security of the entire system could be compromised since potentially malicious agents could easily grant themselves access to perform virtually any action. As a result, the kernel and hypervisor are usually purposefully made difficult to alter. Occasionally, however, it may be desirable to modify these components while the system is running. For example, the hypervisor or kernel may have bugs or errors which need to be patched and it may be advantageous to patch them without rebooting the entire system. This may be particularly useful in multi-tenant shared resource environments (e.g., cloud computing environments) where a single host server provided by a service provider may host multiple virtual machine instances for various customers, and each virtual machine may include a guest operating system having an independent kernel and so on. In various embodiments, the interface (e.g., APIs) described throughout the present disclosure can enable updates and other modifications to the kernel/hypervisor code, as well as numerous other privileged operations.

In accordance with various embodiments, the set of APIs can be implemented by a service provider of a multi-tenant shared resource environment (e.g., a "cloud" computing provider) that hosts applications and virtual machine instances on behalf of its customers. The applications and virtual machine instances are hosted on the physical resources (e.g., host computing devices and other network resources) owned and operated by the service provider. In accordance with an embodiment, the service provider can take a virtual machine image and provision one or more virtual machine instances for the customer based at least in part on the virtual machine image. In one embodiment, each virtual machine instance includes a guest operating system, with its own kernel and drivers, provisioned on the computing resources of the service provider. Once provisioned, the virtual machine instance executes the various applications and/or other services of the customer.

In accordance with an embodiment, each virtual machine instance is provisioned on a host computing device. Each host computing device can host one or more virtual machine instances. In at least one embodiment, the host computing device further includes a hypervisor that provides access to the hardware device drivers and other physical resources of the device and enables the one or more virtual machine instances to access these resources.

In accordance with an embodiment, once the virtual machine instance has been provisioned on the host computing device, the application programming interfaces (APIs) described herein can be used to submit a request to update the code of the hypervisor and/or the kernel of the virtual machine or perform some other privileged operation associated with the hypervisor or kernel. To prevent unauthorized parties from using these interfaces, a signing scheme (e.g., asymmetric cryptography) can be utilized to sign the API request. The signing scheme can utilize a private key and a corresponding public key, where the private key can be used to create a signature associated with the owner of the private key and the public key can be used to verify that signature to ensure that the entity submitting the request is in possession of the private key (i.e. authenticate the request). In one embodiment, the public key is provided to the host computing device and the private key is stored remotely in a secure location on the network of the service provider. When the code of the kernel or hypervisor needs to be modified, a request can be initiated using the API, requesting a privileged operation to be executed on the hypervisor or the operating system kernel. In this embodiment, the request is signed using the private key. When the host computing device receives the request, it attempts to verify the signature of the request using the public key stored on the host computing device. If the signature is successfully verified, the host computing device executes the privileged operation on the hypervisor and/or kernel, otherwise, if the signature of the request cannot be successfully verified using the public key, the privileged operation fails.

In another embodiment, an encryption scheme can be utilized with the API. In this embodiment, the host computing device can generate an asymmetric key pair at boot time. The key pair can include a public key and a private key, where the public key can be used to encrypt the request and the private key can be used to decrypt the request encrypted with using the public key. In this embodiment, after generating the key pair, the host computing device publishes the public key (e.g., to a certificate authority or to another party), while the private key remains on the host computing device and never leaves the host computing device. In this embodiment, when the host computing device receives a request encrypted with the public key, the host computing device can use its internally stored private key to decrypt the request. In this manner, once the request is encrypted, no party can decipher the information in the request without possession of the private key. In addition, if the public key was published to a CA, any requesting parties can ensure that the public key truly belongs to the host computing device by inspecting a certificate issued by the certificate authority (CA).

In some alternative embodiments, symmetric cryptography can be utilized to secure the requests sent to the API. In contrast to asymmetric cryptography, symmetric cryptography would require both the signing party and the host to have possession of the same secret key used to sign the request. The keys held by both parties may be identical or there may be a simple transformation to derive the keys from each other. In symmetric cryptography, the keys represent a shared secret between the host computing device (e.g., the kernel or hypervisor) and any requesting party wishing to modify the code of the hypervisor/kernel. In some embodiments, in order to enable symmetric cryptography, each requesting party would have a different key for each host computing device, which may require some logic to manage all of the secret key combinations on the network.

FIG. 1 illustrates an example 100 of using asymmetric cryptography to sign API requests for performing privileged operations, in accordance with various embodiments. In the illustrated embodiment, a host computing device 101 can include a virtualization layer illustrated as hypervisor 102 and domain0 (Dom0) 105. Dom0 105 and hypervisor 102 can in tern effect a plurality of guests, such as guest 111. The guests can be virtual machine instances, each having their own respective operating system (OS), kernel, device drivers, scheduler and the like. In the illustrated embodiment, Dom-0 105 is used to launch and manage the other guest domains on the host computing device 101. While the virtualization layer is illustrated as separate components in the figure, other implementations of a virtualization layer are possible and within the scope of the disclosure. For example, the functions of Dom0, or a subset of the functions, as well as those affected by the hypervisor 102 can be integrated into a single component.

In accordance with an embodiment, the host computing device 101 provides a set of APIs 108 that can be used to submit signed and/or encrypted requests to perform privileged operations on the virtualization layer, such as the Dom-0 kernel 106 or the hypervisor 102 of the host computing device 101. Example operations can include an operation for altering the running memory image of the hypervisor and/or the kernel. For example, the privileged operation can be to apply a patch to the hypervisor/kernel, read a location in memory, modify one or more variables executing on the host computing device, start/stop a virtual machine instance executing on the host computing device, migrate the virtual machine to another host, or the like. Because the API requests can be signed and/or encrypted, intermediary parties outside of the kernel/hypervisor may not be able to duplicate and/or read the request.

In accordance with an embodiment, the requests of the API 108 can be signed using an asymmetric key pair that includes a private key and a public key. In one embodiment, at least some (or all) of the arguments to the API call are canonicalized and serialized, resulting in a string-to-sign. This string can then be signed either via hash-based message authentication code (HMAC) or asymmetric cryptography, and sent to the API 108. Because the parameters to the API are included in the signature, a potential attacker who obtained the request (e.g., the code that made the request) would be unable to alter the request.

In accordance with some embodiments, the request can contain a timestamp, providing time window based replay protection, where the request remains valid for only a limited duration of time. In some embodiments, the request can include a unique value that is specifically associated with the host computing device 101, such as a serial number or host computing device identifier (ID). While these values may not be secret, including them can bind the request to a particular host computing device 108. In that case, a potential attacker would be prevented from replaying the request against a different device. In some embodiments, the request can be authenticated by the trusted platform module (TPM) (not illustrated) in the host computing device 101 in order to increase the strength of the binding to the host computing device.

In accordance with the illustrated embodiment, the private key 104 used to sign the API requests is not present on the host computing device 101 to which the requests are addressed. Instead, the private key 104 can be stored in a secure location 103 on the network 110 of the service provider, or in another trusted location. As a result, if malicious agents were present on the host computing device 101, they would not be able to forge requests using the private key 104.

The host computing device 101 can include one or more public keys (107, 109) that can be used to verify the signature of the requests which have been signed using the private key 104. In one embodiment, the public key 107 can be compiled into the kernel 106 of the host computing device 101. In another embodiment, the public key 109 can be compiled into the hypervisor 102. In some embodiments, the kernel may store a different public key 107 than the public key 109 stored on the hypervisor, while, in other embodiments, the same public key may be used to verify requests on both the hypervisor and the kernel. In yet other embodiments, rather than storing the actual public key on the host computing device 101, the host computing device 101 may instead be configured to trust any public key that is certified by a particular certificate authority (CA). In those embodiments, the host computing device may receive the request from the requestor, where the request is accompanied by a certificate that includes the public key. The host computing device would trust the certificate of the CA and therefore trust the public key received as part of the request. Regardless of whether the public key is stored on the host computing device or provided along with a certificate, the public key can be used to verify the signature of an API request that was signed using the private key 104. For example, if a user (e.g., customer, technician of the service provider, third party, etc.) wanted to apply an update to some portion of code on the kernel 106, they can obtain use of the private key 104 and use the private key 104 to sign the API request to modify the appropriate portions of code. Upon receiving the request, the kernel 106 can attempt to verify the signature of the request using the public key, and if verification is successful, execute the necessary privileged operations.

In alternative embodiments (not shown), if HMAC and symmetric keys were utilized, the secret key may be compiled into the kernel or the hypervisor. In that case, the secret key could be obfuscated and changed with every build, but the key may actually be present on the host computing device 101. Optionally, the entire request could be encrypted to a key compiled into the kernel, such that the request itself is opaque to the code issuing it.

In some embodiments, one or more restrictions can be applied according to the particular key that has been provided with the request (or according to the party in possession of the key). For example, requests signed by some actors (i.e. certain private keys) may only be allowed to start/stop guest virtual machines on the host or reboot the host computing device 101. Requests signed using a key held by other actors (e.g., OS team of the service provider) may be allowed to modify the running code of the hypervisor 102. In one embodiment, the host computing device 101 can have multiple different public keys stored thereon, where each public key is associated with a private key associated with a different entity (e.g., user, team, etc.) Depending on which entity's private key was used to sign the request, the requested operation may be allowed or denied. In an alternative embodiment, the host computing device 101 may store only one public key that is associated with one private key, however, the request can include the identity of the user submitting the request. Based on this identity, the host computing device 101 may apply different restrictions on the execution of the requested operation. For example, the host computing device 101 may allow one user to stop/start a guest, while another user may be allowed to modify or update code of the hypervisor. Any number of such restrictions (e.g., on a per-key or per-party basis) are possible and within the scope of the embodiments described herein.

Figure 2:
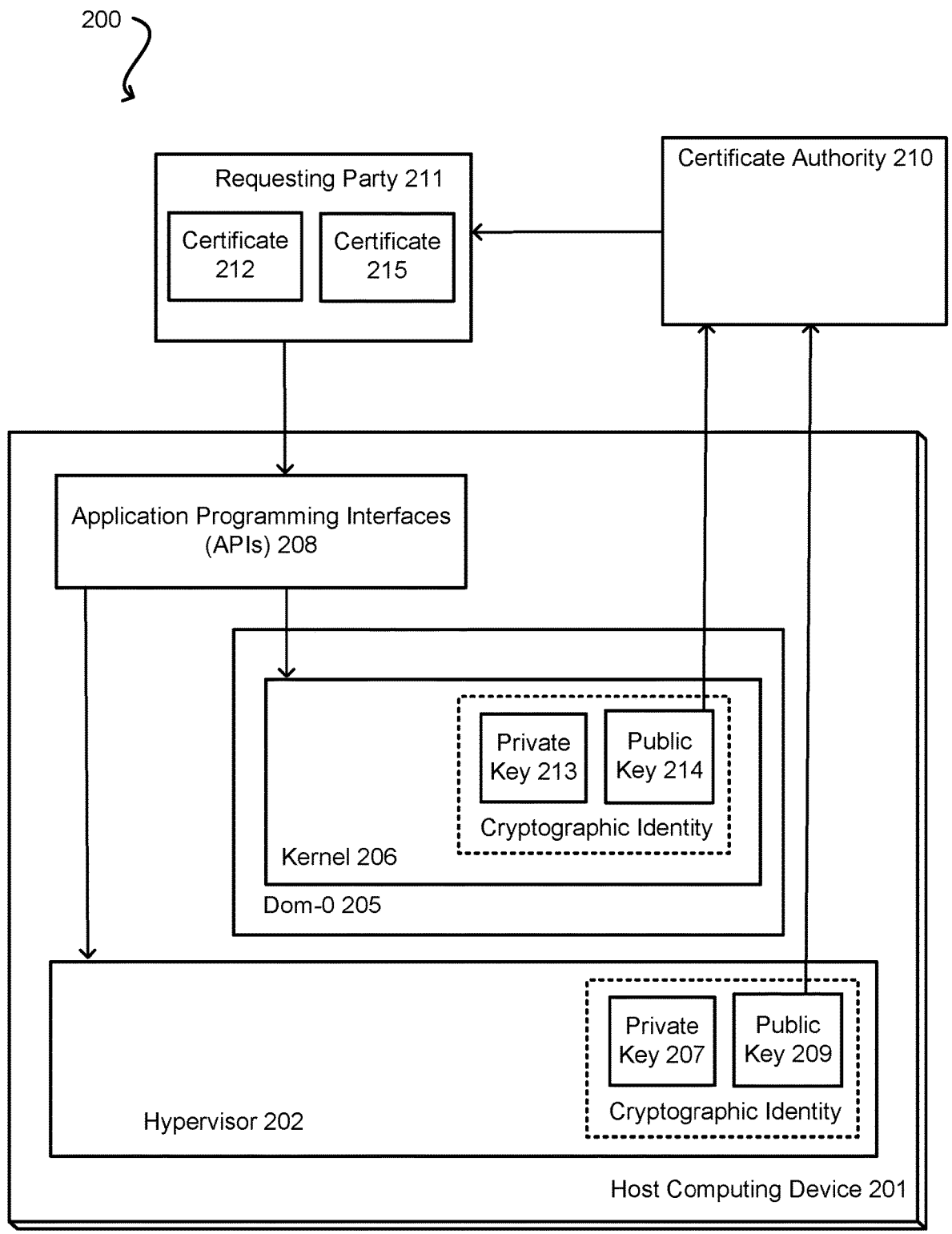
FIG. 2 illustrates an example of APIs that can be utilized to perform privileged operations on the kernel or the hypervisor, in accordance with various embodiments.

FIG. 2 illustrates an example 200 of APIs that can be utilized to perform privileged operations on the virtualization layer, (e.g., a hypervisor 202 and Dom-0 205), in accordance with various embodiments. In the illustrated embodiment, the host computing device 201 (e.g., the Dom-0 205 and/or the hypervisor 202 on the host computing device 201) generates a cryptographic identity comprised of an asymmetric key pair at boot time. For example, when the host computing device 101 is booting, the hypervisor 202 generates a key pair that includes a private key 207 and a public key 209. Similarly, when the Dom-0 205 is loaded, the kernel 206 can generate a key pair comprised of private key 213 and public key 214.

In various embodiments, the public key (209, 213) can be published in some fashion. For example, the public key can be provided to a certificate authority 210. Alternatively, the public key can be provided directly to the requesting party. This public key could be collected, and the request could be encrypted using this key. In this embodiment, the private keys (207, 214) that were generated by the host computing device 201 never leave the host computing device and do not exist anywhere else. If a requesting party 211 can reliably get the public key from the host 201, then it can guarantee that the request encrypted using the public key can only be decrypted by that host 201 (and only that host) because the request an only be decrypted by the private key (207, 213) that never left the host computing device 201. It should be noted that although FIG. 2 illustrates an example where both the Dom0 205 and the hypervisor 202 issue their own respective key pairs, this is not a requirement or a limitation for all embodiments. In some embodiments, only the hypervisor issues a key pair. In other embodiments, only the Dom-0 kernel issues key pairs. Yet in other embodiments, the hypervisor and the Dom-0 kernel can share a key pair.

In some embodiments, the host computing device 201 can provide the public key 209 to a certificate authority (CA) 210. The CA 210 can be an entity that issues one or more digital certificates (212, 215) to appropriate requesting parties (e.g. requesting party 211). The digital certificates certify that the party appropriately owns the public key that can be used to encrypt the API request. In this embodiment, the use of the CA enables the requesting party to believe, with a degree of certainty, that the private key is indeed for the host computing device 201. In one embodiment, the CA is a CA for the service provider and runs within the resource center of the service provider. The resource center is described in further detail with reference to FIG. 3 below. In another embodiment, the CA 210 is a trusted third party that is trusted by both the requesting party 211 (e.g., owner of the certificate) and the host 201 relying upon the certificate. Certificate authorities are well known in the art and are used in many public key infrastructure (PKI) schemes.

In this embodiment, once the CA 210 issues a certificate 212 to a requesting party 211, the requesting party 211 can use the certificate to make API requests to execute privileged operations in the context of the kernel 206 or hypervisor 202. The hypervisor 202 or kernel 206 can then verify that any certificate signed by a particular CA issued to a particular party is valid and can execute the privileged operation accordingly.

It various embodiments, the techniques illustrated in FIG. 2 can be used in conjunction with the techniques illustrated in FIG. 1. For example, the requesting party 211 of FIG. 2 can have its own private key, which the requesting party can use to sign the request to execute a privileged operation. In this embodiment, the request is both signed to ensure authenticity (i.e. the host would know with certainty that the requesting party generated the request), as well as encrypted to ensure privacy (i.e. no external parties could decipher the information contained in the request).

Figure 3:
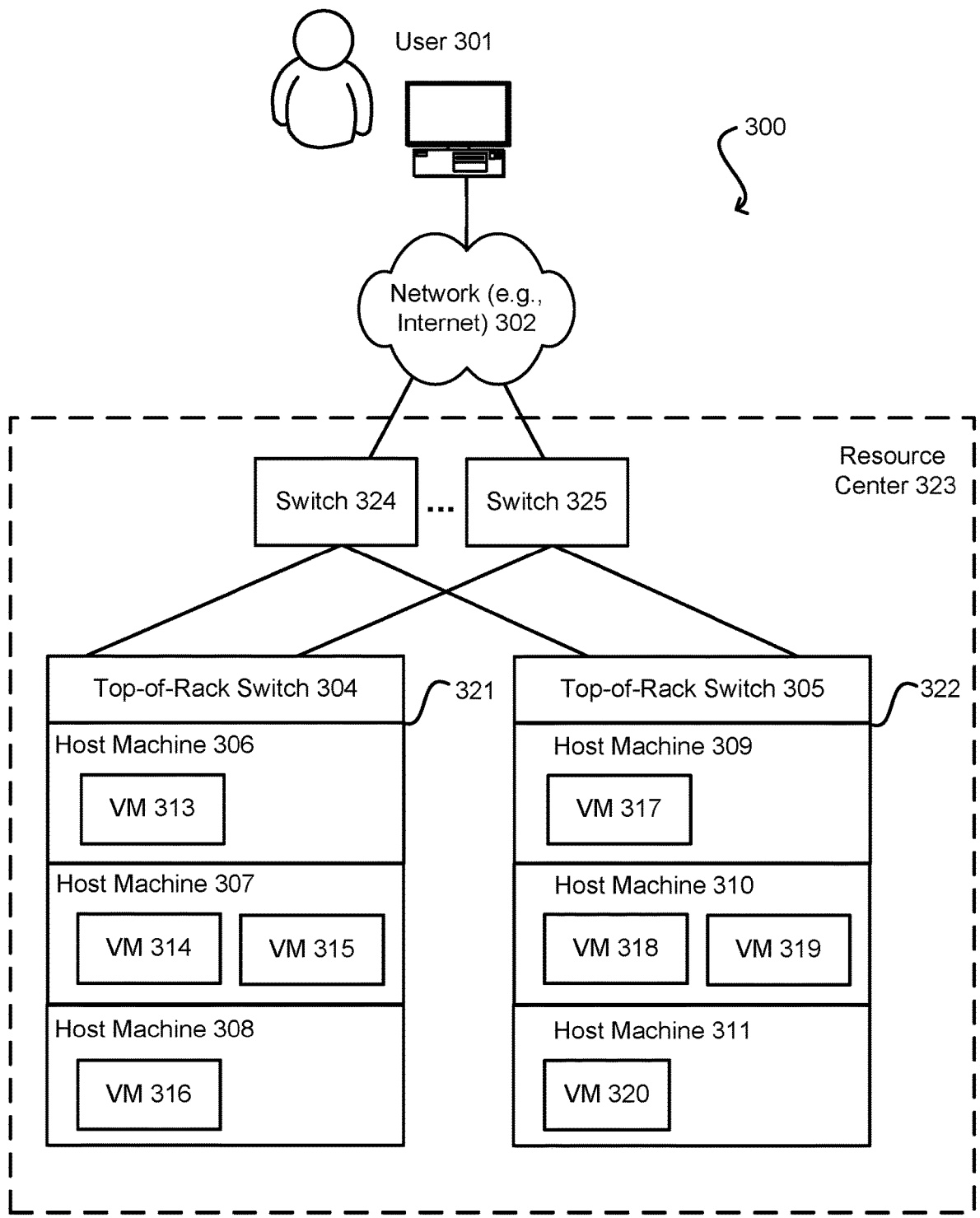
FIG. 3 illustrates an example of a resource center environment of the service provider, in accordance with various embodiments.

FIG. 3 illustrates an example 300 of a resource center environment of the service provider, in accordance with various embodiments. In the illustrated embodiment, a service provider (e.g., a cloud computing resource provider) can maintain one or more resource centers 323 (e.g., data centers, server farms, etc.) that store the physical resources (e.g., host servers, etc.) of the service provider. These physical resources can be used to host a number of guests (e.g., virtual machine instances) that can be provided to users 301 over a network 302, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like.

In the illustrated example, the resource center 323 of the service provider may include one or more racks 321, 322 of host servers (306, 307, 308, 309, 310) wherein each host computing device on a particular rack is connected to a single top-of-rack (TOR) switch (304, 305). These TOR switches can be further connected to one or more other switches (324, 325) which enable the host servers to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can include a virtualization layer (e.g., a hypervisor in combination with a Dom-0) that is used to host one or more guests (e.g., virtual machine instances (313, 314, 315, 316, 317, 318, 319)) that have been provisioned for the customers of the service provider to execute the various applications and services on behalf of those customers. Each guest (e.g., virtual machine) can be provisioned with its own operating system (OS) including a kernel, drivers, process management and the like.

When a customer wishes to obtain a virtual machine instance, the customer can first submit a request to the service provider, indicating the type of guest (e.g., VM) they would like to use. The service provider may carry out the processes to provision the guest which will be hosted on the physical resources (e.g., host computing devices) of the service provider. The guest can then be used to execute the various applications and services on behalf of the customer, utilizing the resources of the service provider.

In accordance with an embodiment, once the guest is up and running, a modification may need to be applied the code of the virtualization layer (e.g., hypervisor or the kernel), or some other privileged operation may need to be performed. For example, the service provider may wish to apply a patch or update to the code of the hypervisor hosting the VMs on the host computing device. Alternatively, the customer (or some other third party) may wish to apply an update to the code of the kernel or the hypervisor. In various embodiments, the APIs described throughout this disclosure enable a user to modify the code in a secure fashion by utilizing asymmetric (or symmetric) cryptography.

Figure 4:
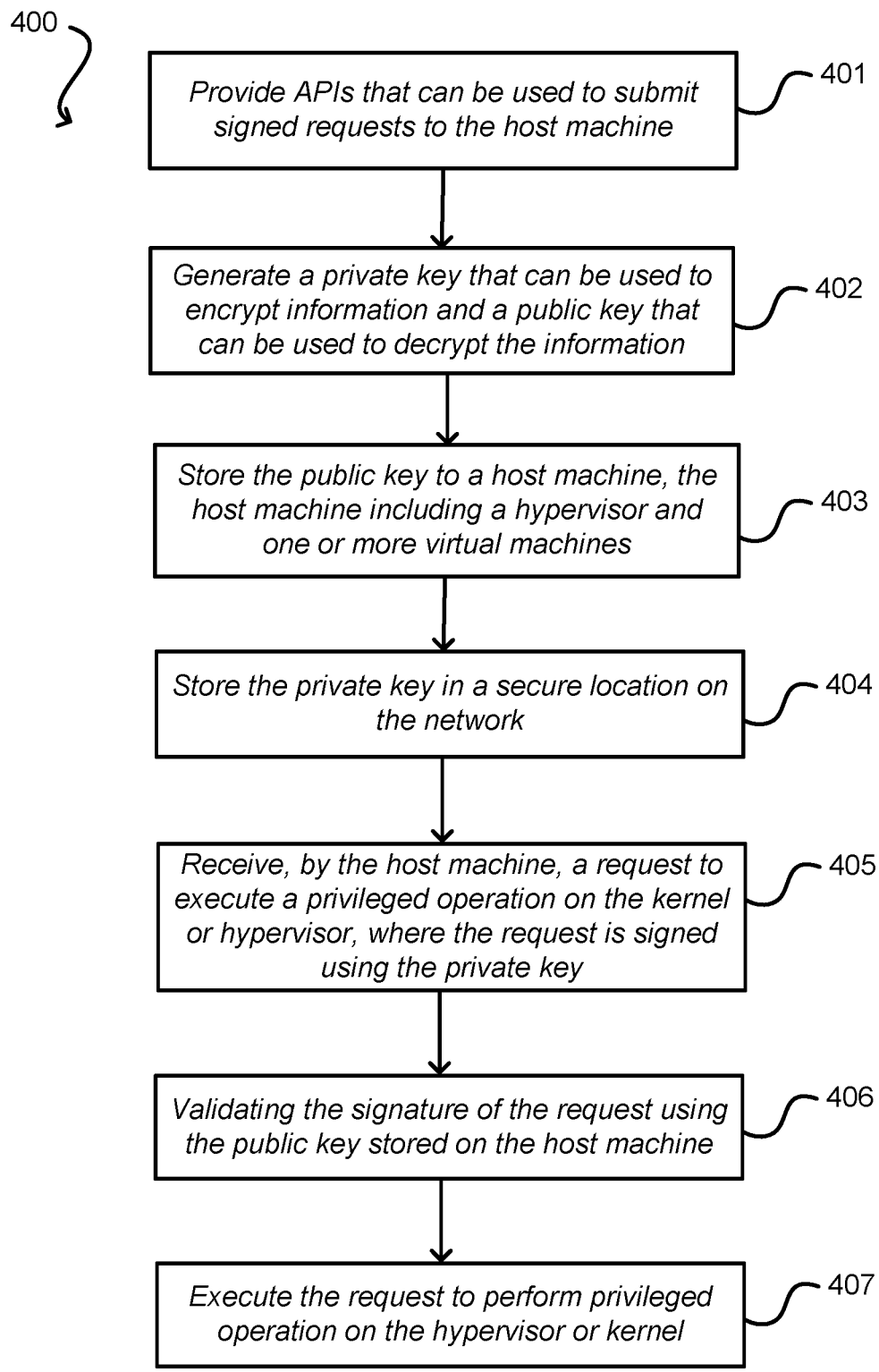
FIG. 4 illustrates an example process for providing APIs that can be used to perform privileged operations in a hypervisor or kernel, in accordance with various embodiments.

FIG. 4 illustrates an example process 400 for providing APIs that can be used to perform privileged operations in a hypervisor or kernel, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, one or more application programming interfaces (APIs) are provided, which can be used to submit signed requests to a host computing device. The host computing device can include a virtualization layer (e.g., a Virtual machine monitor or a Dom0 operating in conjunction with a hypervisor) and one or more guests, (e.g., virtual machines running guest operating systems having operating system kernels).

In operation 402, an asymmetric key pair is generated, including a private key and a corresponding public key. In one embodiment, the asymmetric key pair is generated by the virtualization layer on the host computing device. In another embodiment, the asymmetric key pair can be generated by other entities or services, such as a Certificate Authority. The private key can be used to encrypt information and the public key can be used to decrypt the information encrypted using the private key.

In operation, 403, the public key is stored on the host computing device. For example, the public key can be compiled into the virtualization layer, e.g., the Dom0 or into the hypervisor. Alternatively, the key can be stored in the trusted platform module (TPM) of the host computing device.

In operation 404, the private key is stored in a secure location that is external with respect to the host computing device. In this embodiment, the private key is not present on the host computing device, such that any malicious agent residing thereon would not have access to the private key.

In operation 405, the host computing device receives a request over the API, requesting to execute a privileged operation on the virtualization layer. In accordance with an embodiment, the received request is signed using the private key.

In operation 406, the virtualization layer (e.g., kernel or hypervisor) attempts to validate the signature of the request using the public key stored on the host computing device. If the signature of the request is validated, the privileged operation can be executed on the hypervisor/kernel, as shown in operation 407. If the signature cannot be successfully validated using the public key, the privileged operation fails (i.e. is not executed).

Figure 5:
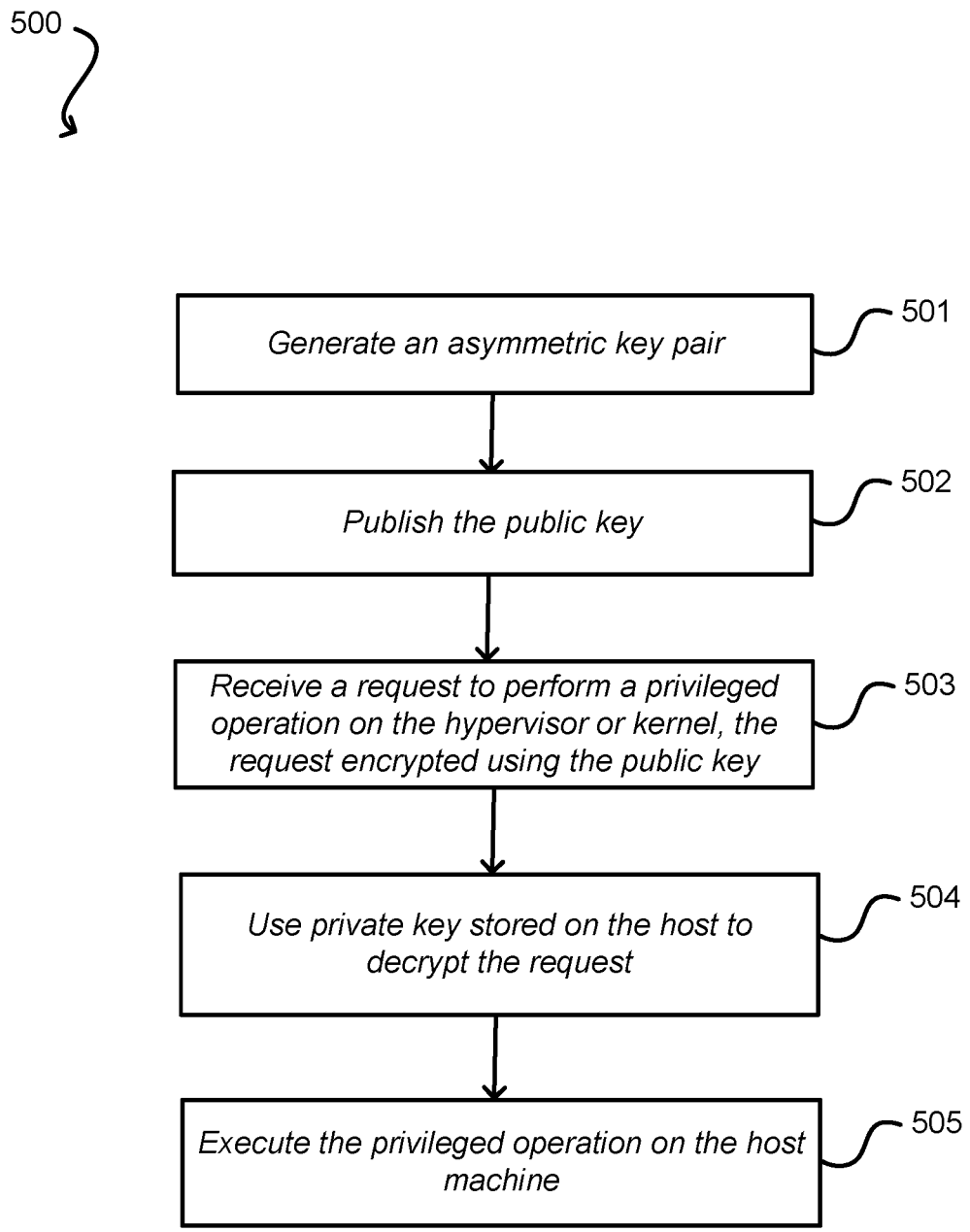
FIG. 5 illustrates an example process of a host computing device for decrypting requests that have been encrypted using a public key, in accordance with various embodiments.

FIG. 5 illustrates an example process 500 performed by a host computing device for decrypting requests that have been encrypted using a public key, in accordance with various embodiments.

In operation 501, the host computing device generates an asymmetric key pair. For example, a boot process on the host computing device may generate a public key and a corresponding private key. In operation 502, the public key is published to a trusted source. In one embodiment, the public key can be provided directly to the requesting party that will use the public key to encrypt requests. In another embodiment, the public key can be provided to a certificate authority, where the certificate authority may grant certificates to authenticated parties that may wish to perform privileged operations on the kernel or hypervisor. In this embodiment, the certificate authority can embed the public key in the certificate and sign the certificate using its own private key. Thus, parties that receive the certificate can verify that the public key is indeed certified by the CA to be from the host computing device.

In operation 504, the host computing device receives a request to perform a privileged operation. The host computing device then attempts to decrypt the request using the private key stored on the host computing device, as shown in operation 505. If the request can be decrypted by using the private key, the host computing device can execute the privileged operation on the kernel/hypervisor, as shown in operation 506.

Figure 6:
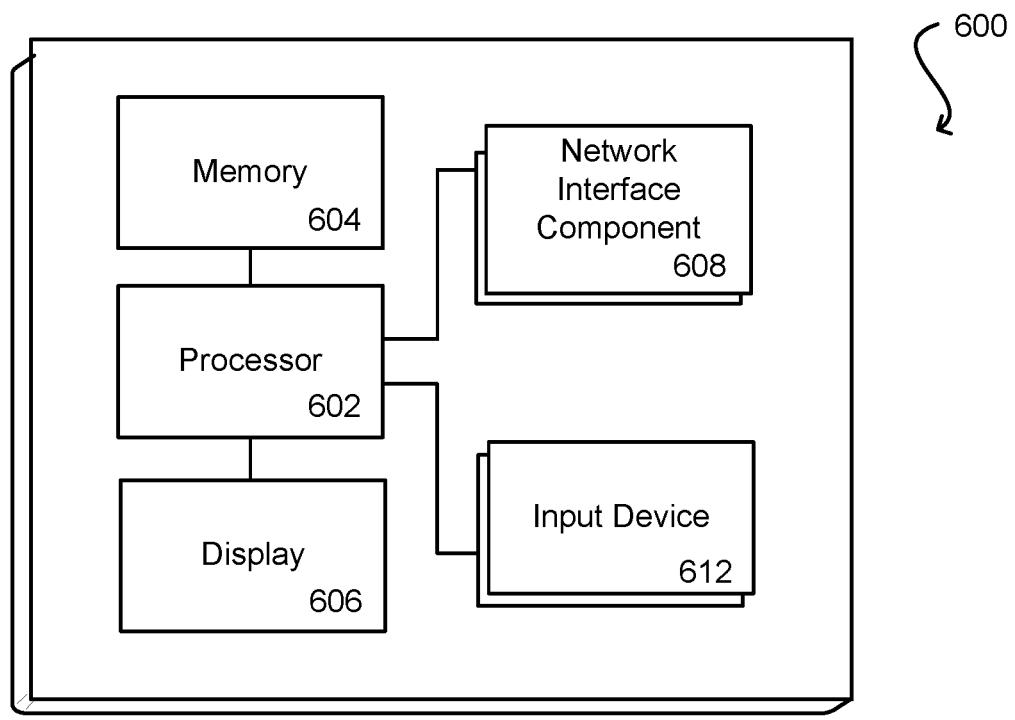
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 5 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
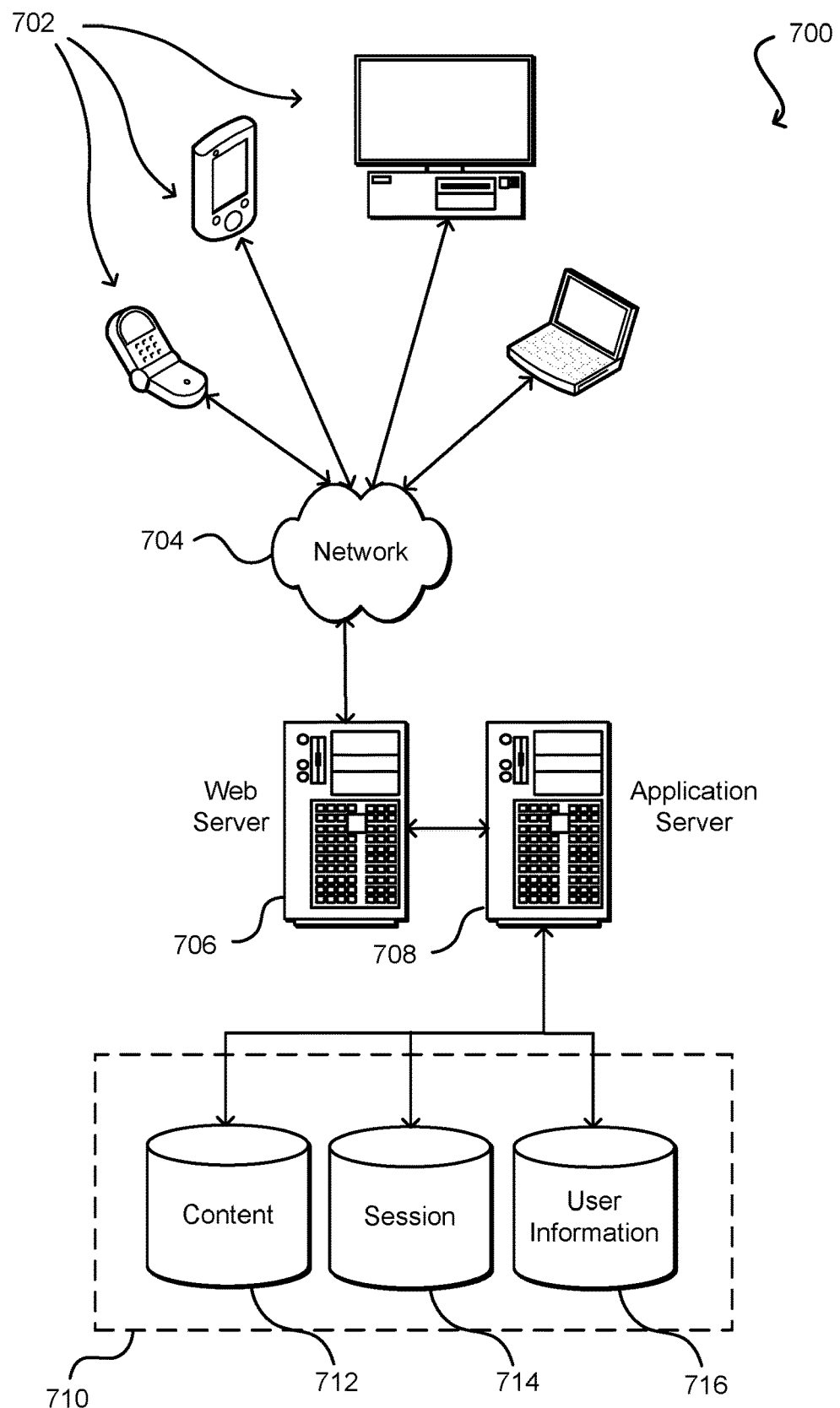
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host computing device as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method comprising:
   generating a key pair comprising a private key and a public key;
   storing the public key on a host computing device of a distributed computing environment;
   storing the private key in a secure location of the distributed computing environment external to the host computing device;
   retrieving, by the host computing device, a request to execute a privileged operation on at least one of a hypervisor of the host computing device and a kernel of the host computing device, the request being secured by the private key and the privileged operation including at least one of an instruction to apply a patch to the host computing device or stop a virtual machine on the host computing device;
   determining a set of permissions associated with the public key;
   determining that the privileged operation is allowed according to the set of permissions;
   verifying the request using the public key stored on the host computing device; and
   executing the privileged operation in the at least one of the hypervisor or the kernel of the host computing device, the privileged operation including applying the patch to at least one of the hypervisor or the kernel of the host computing device.

2. The computer implemented method of claim 1, wherein the privileged operation includes reading a location in memory of a guest hosted on the host computing device.

3. The computer implemented method of claim 1, wherein the privileged operation includes modifying one or more variables executing on the host computing device.

4. The computer implemented method of claim 1, wherein the privileged operation includes shutting down or rebooting a guest executing on the host computing device.

5. The computer implemented method of claim 1, further comprising:
   verifying that an identifier included in the request is associated with the host computing device.

6. The computer implemented method of claim 1, wherein the public key is compiled into the hypervisor of the host computing device.

7. The computer implemented method of claim 1, wherein the public key is compiled into the kernel of the host computing device.

8. The computer implemented method of claim 1, further comprising:
   determining an identity associated with the public key;
   determining a set of permissions associated with the identity; and
   determining that the privileged operation is allowed according to the set of permissions.

9. The computer implemented method of claim 1, further comprising:
   determining a timestamp associated with the request; and
   determining that the request is valid based at least in part on a current time, the timestamp, and a predetermined time window.

10. The computer implemented method of claim 1, wherein storing the public key on the host computing device further includes:
    receiving a certificate issued by a certificate authority, the certificate including the public key.

11. A computing system, comprising:
    at least one processor; and
    memory including instructions that, when executed by the at least one processor, cause the computing system to:
       generate a key pair comprising a private key and a public key;
       store the public key on a host computing device of a distributed computing environment;
       store the private key in a secure location of the distributed computing environment external to the host computing device;
       retrieve, by the host computing device, a request to execute a privileged operation on at least one of a hypervisor of the host computing device and a kernel of the host computing device, the request being secured by the private key and the privileged operation including at least one of an instruction to apply a patch to the host computing device or stop a virtual machine on the host computing device;
       determine a set of permissions associated with the public key;
       determine that the privileged operation is allowed according to the set of permissions;
       verify the request using the public key stored on the host computing device; and
       execute the privileged operation in the at least one of the hypervisor or the kernel of the host computing device, the privileged operation including applying the patch to at least one of the hypervisor or the kernel of the host computing device.

12. The computing system of claim 11, wherein the privileged operation includes a request to:
    read a location in memory of a guest hosted on the host computing device;
    modify one or more variables executing on the host computing device; or
    shut down or reboot a guest executing on the host computing device.

13. The computing system of claim 11, wherein the memory further includes instructions that, when executed by the at least one processor, cause the computing system to:
    verify that an identifier included in the request is associated with the host computing device.

14. The computing system of claim 11, wherein the public key is compiled into the hypervisor or the kernel of the host computing device.

15. The computing system of claim 11, wherein the memory further includes instructions that, when executed by the at least one processor, cause the computing system to:
   determine an identity associated with the public key;
   determine a set of permissions associated with the identity; and
   determine that the privileged operation is allowed according to the set of permissions.

16. The computing system of claim 11, wherein the memory further includes instructions that, when executed by the at least one processor, cause the computing system to store the public key on the host computing device, further cause the computing device to:
   determine a timestamp associated with the request; and
   determine that the request is valid based at least in part on a current time, the timestamp, and a predetermined time window.

17. The computing system of claim 11, wherein the memory further includes instructions that, when executed by the at least one processor, cause the computing system to:
   receive a certificate issued by a certificate authority, the certificate including the public key.

* * * * *